United States Patent [19]

Okuyama et al.

[11] 4,022,719
[45] May 10, 1977

[54] PROCESS FOR PRODUCING POLYAMIDE FOAM

[75] Inventors: Toru Okuyama; Susumu Muta; Suminobu Kurahashi, all of Yokohama; Shigetake Sato, Kamakura, all of Japan

[73] Assignee: Bridgestone Tire Company Limited, Tokyo, Japan

[22] Filed: May 12, 1975

[21] Appl. No.: 576,321

Related U.S. Application Data

[63] Continuation of Ser. No. 451,189, March 11, 1974, abandoned, which is a continuation of Ser. No. 415,402, Nov. 13, 1973, abandoned, which is a continuation-in-part of Ser. No. 305,667, Nov. 13, 1972, abandoned.

[52] U.S. Cl. .......................... 260/2.5 N; 260/78 L
[51] Int. Cl.² .......................................... C08J 9/02
[58] Field of Search .............................. 260/2.5 N

[56] References Cited

UNITED STATES PATENTS

| | | | |
|---|---|---|---|
| 3,236,789 | 2/1966 | Fuller | 260/2.5 N |
| 3,322,696 | 5/1967 | Fisher et al. | 260/2.5 N |
| 3,376,237 | 4/1968 | Fuller | 260/2.5 N |
| 3,382,195 | 5/1968 | Gilch et al. | 260/2.5 N |
| 3,454,689 | 7/1969 | Garrison | 260/2.5 N |
| 3,574,146 | 4/1971 | Schnell et al. | 260/2.5 N |
| 3,591,533 | 2/1971 | Schnell | 260/2.5 N |
| 3,645,928 | 2/1972 | Wakamura et al. | 260/2.5 N |
| 3,679,613 | 7/1922 | Gilch et al. | 260/2.5 N |
| 3,682,847 | 8/1972 | Gilch et al. | 260/2.5 N |
| 3,702,313 | 11/1972 | Gilch et al. | 260/2.5 N |

*Primary Examiner*—Morton Foelak
*Attorney, Agent, or Firm*—Brooks Haidt Haffner & Delahunty

[57] ABSTRACT

Methods of preparing polyamide foam comprising polymerizing and foaming a mixture of one or more specified lactams, a basic alkali metal lactam catalyst, an alkyl isocyanate activator and a foaming agent at a temperature above the melting point of the lactam, and below the melting point of the polyamide foam thus produced.

4 Claims, 2 Drawing Figures

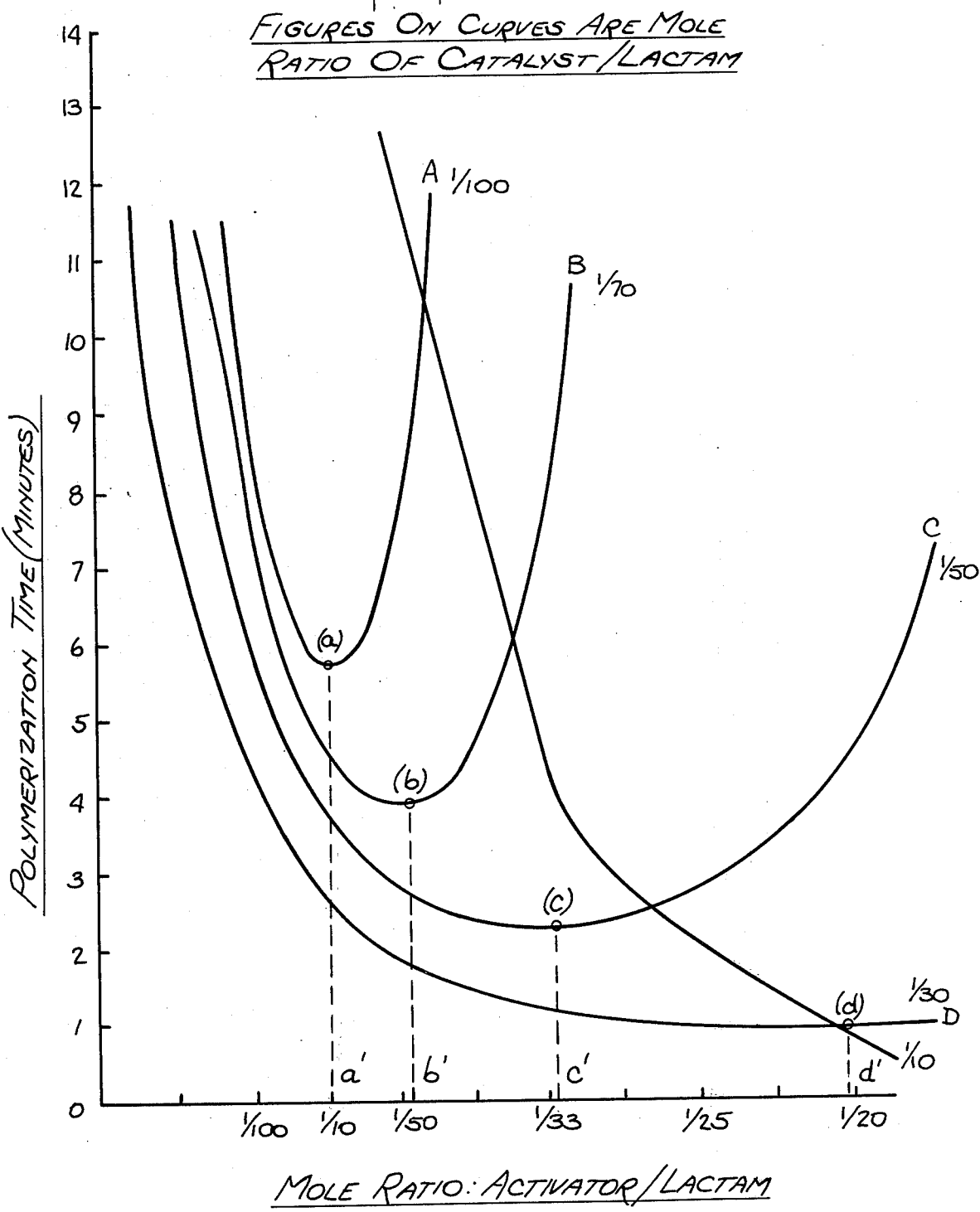

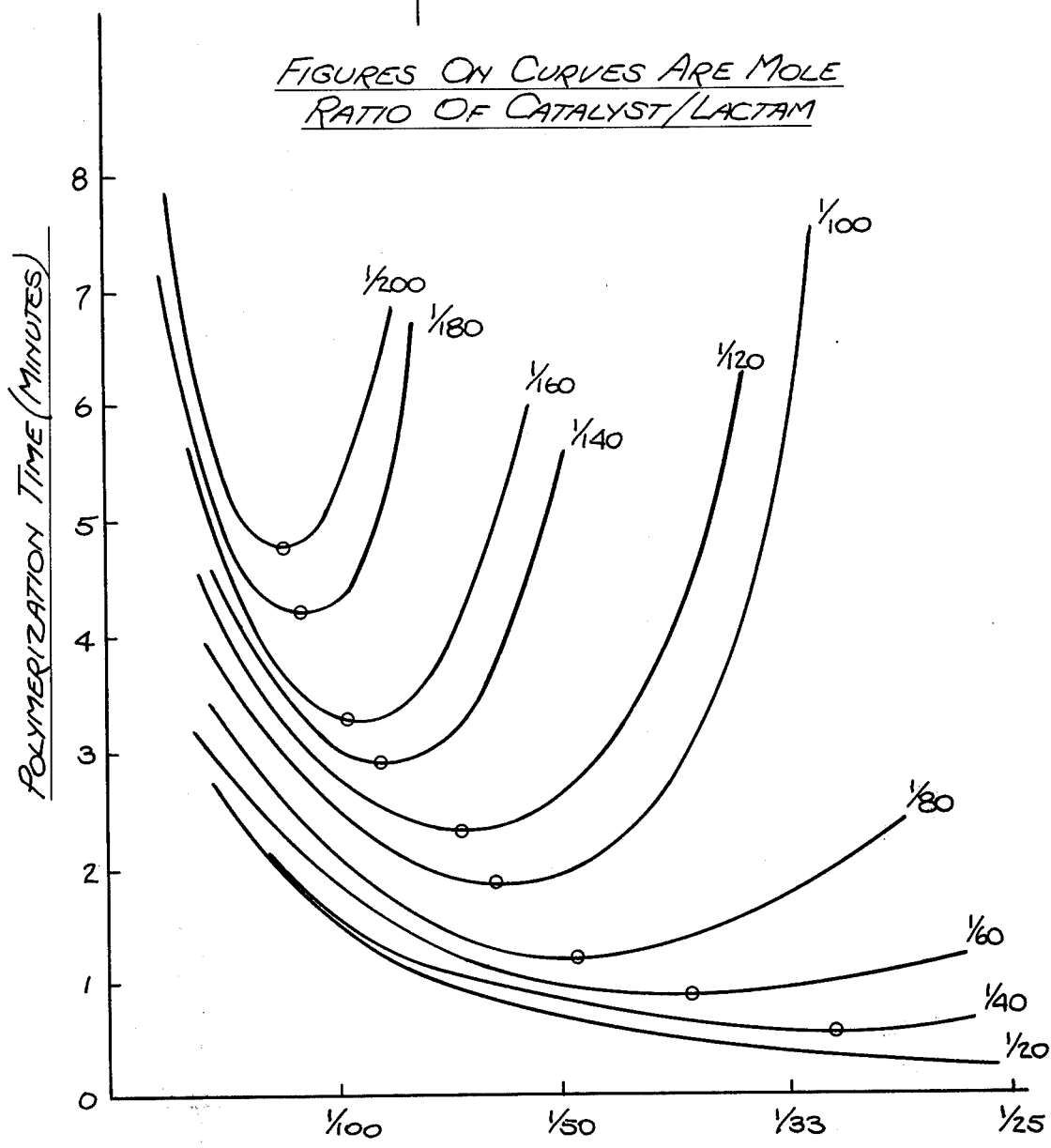

PROCESS FOR PRODUCING POLYAMIDE FOAM

This application is a continuation of formerly copending application Ser. No. 451,189, filed Mar. 11, 1974, which was a continuation of Ser. No. 415,402, filed Nov. 13, 1973, which latter application was in turn a continuation-in-part of patent application Ser. No. 305,667, filed Nov. 13, 1972, all of said earlier applications now being abandoned.

BACKGROUND OF THE INVENTION

1. Field of the Invention

This invention relates to processes for producing polyamide foam.

2. Description of the Prior Art

Polyamide foam has recently been produced by polymerizing a lactam in the presence of a basic catalyst, an activator and a foaming agent, but the prior process has not been used on a commercial basis on account of a number of disadvantages. First, the polymerization foaming temperature is high, at least higher than 130° C, and preferably higher than 150° C, and even at these temperatures the rate of polymerization is low.

Secondly, the volume of foam produced is relatively small, and accordingly the foam produced has a high density with very limited use. The production of such foam is further complicated since the polymerization should be performed in the absence of moisture under an inert gas atmosphere. Finally, the cost of such foam is very high since special compounds are required as activators.

SUMMARY OF THE INVENTION

According to the present invention, a polyamide foam can be produced by polymerizing ε-caprolactam, dodecanolactam, or a mixture thereof in the presence of a basic catalyst which is a sodium or potassium salt of the lactam, the mole ratio of catalyst to lactam being from about 1/200 to about 1/10, an isocyanate activator which is hexamethylene diisocyanate, m-xylene diisocyanate or hydrogenated diphenyl methane-4,4'-isocyanate in an amount from 0.5 to 2.5 times the amount of catalyst, on a molar basis, and a foaming agent at a temperature above the melting point of the lactam and below the melting point of the polyamide foam. The foaming takes place simultaneously with the polymerization and in a very short time to provide the finished foam.

The process herein described provides a polyamide foam-producing process which affords good yields of low-density foam in relatively short times. It will be noted by those skilled in the art from the present disclosure that the time required from beginning of addition of activator and foaming agent to the finish of the polymerized foam so produced is generally about 30 to about 200 seconds.

Moreover, the special activators required by prior art processes are obviated. Thus, production of such foams becomes commercially feasible according to the present invention.

The invention will further be described with respect to the accompanying drawings wherein:

FIG. 1 shows the relationship between sodium caprolactam catalyst concentration, activator concentration, and polymerization time, and FIG. 2 shows the relationship between potassium caprolactam concentration, activator concentration, and polymerization time.

DESCRIPTION OF THE PREFERRED EMBODIMENTS

As noted above, the present invention is carried out with ε-caprolactam, dodecanolactam, or a combination of these two lactams. The preferred dodecanolactam is λ-dodecanolactam. The amounts of the two lactams in mixtures can be varied from pure caprolactam to pure dodecanolactam. A particularly preferred lactam for use herein is ε-caprolactam.

The process of the present invention utilizes a basic catalyst in the production of the polyamide foam material. The basic catalyst used herein is one which is a sodium or potassium salt of the lactam or lactams employed. The catalysts used herein are conveniently prepared by adding an appropriate reagent to a quantity of the lactam used to prepare the foam. Thus, sodium can be added to caprolactam to provide the sodium caprolactam catalyst. Sodium caprolactam, potassium caprolactam, sodium dodecanolactam and potassium dodecanolactam can be so prepared and have been found to be particularly useful in carrying out the present invention. A preferred catalyst utilized in certain embodiments of the present invention is the sodium ε-caprolactam reaction product.

The present invention utilizes as an activator in the reaction mixture with the lactam a variety of organic isocyanate compounds wherein the isocyanate groups are not directly substituent on an aromatic ring. Thus, the reaction mixture according to the present invention can utilize hexamethylene diisocyanate, m-xylylene diisocyanate, and hydrogenated diphenylmethane 4,4'-diisocyanate. A particularly preferred isocyanate for use according to the present invention is hexamethylene diisocyanate.

It has been found according to the present invention that the polymerization rate of a lactam is highest when the molar concentration of the catalyst is from about 1/200 to 1/10 of a mole of the lactam used and the amount of activator is from about 0.5 to about 2.5 times the quantity of catalyst. That is, when the amount of activator is less than 0.5 times or more than about 2.5 times that of the catalyst, the polymerization rate is very low, even though the ratio of catalyst to lactam is in the preferred range of 1/200 to 1/10, on a molar basis.

On the other hand, it has also been found that the polymerization rate is very slow when the molar ratio of activator to catalyst is in the range of 0.5 to 2.5 and the ratio of catalyst to lactam is outside the preferred range of 1/200 to 1/10. The process according to the present invention has the further advantage that the reaction mixture is relatively insensitive to moisture during the polymerization, and it is accordingly not necessary to polymerize in the presence of an inert gas with stringent measures taken to exclude moisture.

The foaming agents for use in the present invention are selected from those conventionally used to prepare foamed products. They can be either of the volatile type or of the decomposition type. Typically, desirable volatile foaming agents include materials which will volatilize at the temperatures in the foam-producing reaction mixture to provide vapor bubbles and include aromatic types such as benzene, toluene, xylene, and the like; cyclic ether materials such as dioxane and the like; alicyclic hydrocarbons such as cyclohexane and the like; and aliphatic hydrocarbons such as petroleum benzine, petroleum ether, ligroin, and the like. The decomposition-type foaming agents include nitrogen compounds such as azodicarbonamide, azo-bis-(isobutyronitrile), dinitroso pentamethylene tetramine, and the like. It will be appreciated from the present disclosure that two or more of such foaming agents can be used in the practice of the process, depending upon particular reactants, catalyst, and finished properties desired in the polyamide foam.

The temperature at which the polymerization and foaming is carried out lies within the range defined by the melting point of the lactam utilized and the melting point of the polyamide foam product. That is, the reaction temperature is above the melting point of the lactam, but below the melting point of the product. In certain preferred embodiments of the invention contemplated herein, the temperature is from about 90° C to about 180° C, and preferably from 120° C to 160° C.

The polymerization/foaming reaction according to the present invention can be carried out at a range of pressures from somewhat sub-atmospheric to super-atmospheric. In order to minimize the special equipment and handling which might otherwise be required and to realize the full advantages of the simplicity of the present process, it is desirable to carry out the reaction at atmospheric pressure.

The reaction mixture can also contain adjuvant materials to vary the properties of the finished composition or to simplify production thereof. Thus, the reaction mixture can include quantities of silicone surfactants. The reaction mixture can also contain filler materials including inorganic substances such as glass fiber or talc. Organic or inorganic pigments and/or dyestuffs and other adjuvant materials can also be included in the reaction mixture to impart desired properties to the finished polyamide foam.

It will accordingly be appreciated that the present invention provides features heretofore not attainable by prior art methods. It is possible to conduct the polymerization/foaming at relatively low temperatures. The foam products can have a very fine cell structure and very low density, as controlled among other things by the type and amount of foaming agent. Moreover the rate of reaction can be increased so that the foams can be economically mass-produced. Further, as noted above, there is generally no need rigorously to exclude moisture-containing ambient atmosphere or to use specifically enclosed vessels or pressure vessels.

The preferred conditions for producing a polyamide foam having a very fine cell structure and very low density call for polymerizing ε-caprolactam in the presence of from 1/20 to 1/100 of a mole sodium caprolactam, about 1.5 times the molar quantity of hexamethylene diisocyanate per mole of ε-caprolactam, and a volatile type foaming agent at a temperature of from 120° to 160° C.

The following examples are given to illustrate embodiments of the invention as it is presently preferred to practice it. It will be understood that these examples are illustrative, and the invention is not to be considered as restricted thereto except as indicated in the appended claims.

EXAMPLE 1

Dry ε-caprolactam in the amount of 135.6 g is melted in a flask under an atmosphere of dry nitrogen gas and 4.6 g of metallic sodium is added thereto with stirring to convert a part of the ε-caprolactam to sodium caprolactam, and 1/5 mole of sodium caprolactam is formed. Twenty point seven grams of the product so produced and 83.3 g of ε-caprolactam are weighed in a stainless beaker and melted in an oil bath at 100° C. The resulting composition is denominated "Component 1".

Ten grams of toluene, 1 g of silicone surfactant SH-193 (manufactured by Toray Silicone Co.), and 7.6 g of hexamethylene diisocyanate are weighed into a beaker, and designated "Component 2".

Components 1 and 2 are mixed and stirred with a stirrer for about 15 seconds, and the resulting mixture is transferred to a foaming vessel. Foaming is completed after 35 seconds. The product is a rigid foam having uniform fine cells and a density of 0.0418 g/cm$^3$.

For comparison, the process of Example 1 is repeated using 15.4 g of 2,4- and 2,6-tolylene diisocyanates (a mixture of 80 percent of 2,4-tolylene diisocyanate and 20 percent of 2,6-tolylene diisocyanate) in place of the hexamethylene diisocyanate and heating with Component 1 in an oil bath at 140° C. Foaming does not occur, and a satisfactory polyamide foam is not produced.

The process of Example 1 is again repeated using 10.7 g of phenyl isocyanate in place of the hexamethylene diisocyanate. Foaming does not occur and the product is not a satisfactory foamed polyamide.

The process of Example 1 is repeated using 9.5 g of 1,4-naphthalene diisocyanate in place of the hexamethylene diisocyanate. There is no foaming and the desired product is not provided.

EXAMPLE 2

Fifteen and five-tenths grams of caprolactam containing 1/5 mole of sodium caprolactam per mole of caprolactam, prepared by the same process as that of Example 1, and 87.5 g of ε-caprolactam are weighed and introduced into a stainless beaker and melted in an oil bath of 110° C. The resulting mixture is designated "Component 1".

Ten grams of toluene, 1 g of silicone surfactant stabilizer SH-193 (manufactured by Toray Silicone Co.), and 7.6 g of hexamethylene diisocyanate are weighed and placed in a beaker. The resulting mixture is called "Component 2".

Components 1 and 2 are mixed and stirred with a stirrer for about 15 seconds, and the resulting mixture is transferred to a foaming vessel. Foaming is completed after about 40 seconds. The resulting product is a rigid foam having uniform fine cells and a density of 0.043 g/cm$^3$.

EXAMPLE 3

Twenty point seven grams of caprolactam containing 1/5 mole of sodium caprolactam per mole of caprolactam, prepared by the same process as that of Example 1, and 83.3 g of ε-caprolactam are weighed, placed into a stainless beaker, and melted in an oil bath at 120° C. The resulting mixture is named "Component 1".

Ten grams of toluene, 1 g of silicone surfactant SH-193 (manufactured by Toray Silicone Co.), and 6.2 g of meta-xylylene diisocyanate are weighed and placed in a beaker. The resulting mixture is called "Component 2".

Components 1 and 2 are mixed and stirred with a stirrer for about 15 seconds, and the mixture is transferred to a foaming vessel. The resulting foam is a rigid one having uniform fine cells and a density of 0.042 g/cm³.

EXAMPLE 4

Twenty point seven grams of caprolactam containing 1/5 mole of sodium caprolactam per mole of caprolactam, prepared by the same process as that of Example 1, and 83.3 g of ε-caprolactam are weighed, placed in a stainless beaker, and melted in an oil bath at 135° C. The resulting mixture is designated "Component 1".

Ten grams of toluene, 1 g of silicone surfactant SH-193 (manufactured by Toray Silicone Co.), and 6.5 g of hydrogenated diphenylmethane-4,4'-diisocyanate are weighed and placed in a beaker. The resulting mixture is called "Component 2".

Components 1 and 2 are mixed and stirred with a stirrer for about 15 seconds, and the resulting mixture transferred to a foaming vessel. Foaming is completed after about 60 seconds. The product is rigid foam having uniform fine cells and a density of 0.042 g/cm³.

EXAMPLE 5

ε-Caprolactam in the amount of 135.6 g is melted in a flask under an atmosphere of dry nitrogen gas and 4.6 g of metallic sodium is gradually added thereto with stirring to form a caprolactam containing 1/5 mole of sodium caprolactam for each mole of the caprolactam. Then 6.2 g of the mixture is weighed into a test tube and 5 g of ε-caprolactam is added to form a caprolactam containing 1/10 mole of sodium caprolactam per mole of lactam and is kept in an oil bath at 100° C with nitrogen flush and stirring. This mixture is denominated "Component 1".

To samples of Component 1 are added as a second component solutions containing various concentrations of hexamethylene diisocyanate in 10 parts of toluene, and the resulting mixture is stirred for 30 seconds by bubbling nitrogen. The time between the addition of Component 2 and elimination of fluidity of the mixture is designated as "polymerization time".

In the same manner, caprolactams containing various concentrations of catalyst are prepared by adding a specified amount of ε-caprolactam to the mixture of caprolactam containing 1/5 mole of sodium caprolactam per mole of lactam and are kept at 100° C. Toluene solutions having various concentrations of hexamethylene diisocyanate are added to such caprolactams and stirred with bubbling nitrogen, and each polymerization time is measured. The relationship between quantity of catalyst, quantity of activator, and polymerization time is presented in FIG. 1.

FIG. 1 shows that the polymerization rate is highest (i.e., the time required is at a minimum) when the concentration of activator is about 1.4 to 1.5 times the amount of the catalyst and the polymerization rate is very low when amounts of the activator less than 0.5 times or more than 2.5 times the amounts of catalyst are used.

Furthermore, the ratio of concentrations of catalyst and activator at the highest polymerization rate is almost constant. FIG. 1, Curve A shows polymerization times of ε-caprolactam with catalyst (sodium caprolactam) having a ratio of 1/100 mole per mole of caprolactam and hexamethylene diisocyanate at various concentrations is used. The ratio of hexamethylene diisocyanate having the shortest polymerization time shown at a and extended to the abscissa at a' is 1/69 mole per mole of caprolactam. The mole ratio of activator (hexamethylene diisocyanate to catalyst (sodium caprolactam in this case) is 1/69:1/100, or 1.45. The minimum activator/catalyst ratio in Curve B, as shown at b is 1/48:1/70, or 1.46. The ratio in Curve C is 1/30:1/50, or 1.67, while the ratio in Curve D is 1/20:1/30, or 1.5. Thus, when the amount of activator is about 1.5 times greater than the amount of catalyst, the polymerization time is at a minimum and the rate is highest under the conditions shown.

EXAMPLE 6

ε-Caprolactam in the amount of 135.6 g is melted in a flask under an atmosphere of dry nitrogen gas, and 7.8 g of metallic potassium is slowly added thereto with stirring to form a caprolactam containing 1/5 mole of potassium catalyst per mole of lactam. Then 3.17 g of the mixture is weighed into a test tube, and 7.5 g of ε-caprolactam is added thereto to form a caprolactam containing 1/20 mole of potassium caprolactam per mole of lactam. The caprolactam so prepared is kept in an oil bath at 100° C with a nitrogen blanket and stirring. The resulting mixture is designated "Component 1".

To Component 1 is added Component 2 which is a solution containing various concentrations of hexamethylene diisocyanate in 10 parts of toluene. The mixture is stirred with bubbling nitrogen for 30 seconds, and the time between addition of Component 2 and elimination of fluidity of the mixture is measured, and designated as the polymerization time.

By the same procedure as in Example 5, caprolactam solutions containing various concentrations of catalyst are prepared by adding the required amount of ε-caprolactam to the mixture of potassium caprolactam and caprolactam, and these mixtures are kept at 100° C. The toluene solutions of various concentrations of hexamethylene diisocyanate are added to said caprolactam solutions and stirred by bubbling nitrogen, and each polymerization time is measured.

FIG. 2 shows the relationship between the quantity of catalyst, quantity of activator, and polymerization time.

From the foregoing procedure, it is found that the polymerization rate is highest when the quantity of activator is about 1.5 times the amount of catalyst and is low when the quantity of activator is less than 0.5 times or more than 2.5 times that of the catalyst.

EXAMPLE 7

ε-Caprolactam in the amount of 135.6 is melted in a flask under an atmosphere of dry nitrogen gas, and 4.6 g of metallic sodium is gradually added thereto with stirring to form a caprolactam containing 1/5 mole of sodium caprolactam per mole of lactam. Then 15.5 g of this mixture and 87.5 g of ε-caprolactam are weighed into a stainless beaker and mixed to form a caprolactam containing 1/40 mole of sodium caprolactam for each mole of lactam. This is melted in an oil bath at 125° C and designated "Component 1".

Ten grams of toluene, 1 g of silicone surfactant SH-193 (manufactured by Toray Silicone Co.), and 3.72 g of hexamethylene diisocyanate (1/40 mole per mole of caprolactam) are weighed into a beaker and designated "Component 2".

Components 1 and 2 are mixed and stirred for about 10 seconds and then transferred to a foaming vessel. Foaming is completed after 55 seconds. The resulting polyamide foam product is rigid having uniform fine cells and a density of 0.038 g/cm³.

By the same procedure as above, foaming is carried out with various amounts of hexamethylene diisocyanate to measure the hardening time of the foam and the foam density.

The results are shown in Table 1.

Table 1

| Run No. | Molar ratio of activator to lactam | Molar ratio of activator to catalyst | Hardening Time (sec) | Foam Density (g/cm³) |
|---|---|---|---|---|
| 1 | 1/120 | 0.33 | 125 | impossible to measure |
| 2 | 1/60 | 0.67 | 55 | 0.040 |
| 3 | 1/40 | 1.0 | 40 | 0.038 |
| 4 | 1/25 | 1.6 | 42 | 0.037 |
| 5 | 1/20 | 2.0 | 48 | 0.038 |
| 6 | 1/10 | 4.0 | Does not harden | — |

From the foregoing tabulation it will be apparent that foam is not obtained when the quantity of hexamethylene diisocyanate is less than 0.5 times or more than 2.5 times that of the catalyst.

COMPARISON EXAMPLE

The procedure of Example 7 is repeated using 6.2 g of toluene diisocyanate instead of the 3.72 g of hexamethylene diisocyanate, and polymerization and foaming do not take place. Furthermore, even in an oil bath at 135° C, polymerization and foaming do not take place.

It will thus be apparent that toluene diisocyanate cannot be utilized.

EXAMPLE 8

Caprolactam in the amount of 7.75 g containing 1/5 mole of sodium caprolactam per mole of lactam prepared by the process of Example 7 and 93.75 g of ε-caprolactam are weighed to form a caprolactam containing 1/80 mole of sodium caprolactam per mole of lactam. This is melted in an oil bath at 136° C and designated as "Component 1".

Ten grams of toluene, 1 g of silicone surfactant SH.193 (manufactured by Toray Silicone Co.), and 3.0 g of hexamethylene diisocyanate (1/50 mole per mole of caprolactam) are weighed into a beaker. The resulting mixture is designated "Component 2".

Components 1 and 2 are mixed and stirred for about 10 seconds, and the resulting mixture is transferred to a foaming vessel. Foaming begins immediately and hardening of the foam is complete after 68 seconds. The resulting polyamide foam product is rigid having uniform fine cells and a density of 0.039g/cm³.

By the procedure of Example 8, varying amounts of hexamethylene diisocyanate in Component 2 are utilized to measure foam hardening time and foam density.

The results are shown in Table 2.

Table 2

| Run No. | Molar ratio of activator to lactam | Molar Ratio of activator to catalyst | Hardening Time (sec) | Foam Density (g/cm³) |
|---|---|---|---|---|
| 1 | 1/200 | 0.4 | Does not harden | — |
| 2 | 1/100 | 0.8 | 62 | 0.043 |
| 3 | 1/50 | 1.6 | 40 | 0.039 |
| 4 | 1/40 | 2.0 | 40 | 0.039 |
| 5 | 1/20 | 4.0 | Does not harden | — |

EXAMPLE 9

Caprolactam in the amount of 5.2 g containing 1/5 mole of sodium caprolactam per mole of lactam prepared by the process of Example 7 and 95.8 g of ε-caprolactam are weighed into a stainless beaker to form a caprolactam containing 1/120 mole of sodium caprolactam per mole of lactam, which is melted in an oil bath at 155° C. The resulting mixture is designated "Component 1".

Six grams of toluene, 1 g of silicone surfactant SH-193 (manufactured by Toray Silicone Co.), and 1.85 g of hexamethylene diisocyanate (1/80 mole per mole of caprolactam) are weighed into a beaker. The resulting mixture is designated "Component 2".

Components 1 and 2 are mixed and stirred for about 10 seconds, and the resulting mixture is transferred to a foaming vessel. Foaming begins after five seconds and hardening of foam is complete after 68 seconds. The resulting polyamide foam product is rigid with uniform fine cells and a density of 0.069 g/cm³.

By the same procedure, foams are prepared with varying quantities of hexamethylene diisocyanate in Component 2 to measure hardening time and foam density.

The results are shown in Table 3.

TABLE 3

| Run No. | Molar ratio of activator to lactam | Molar ratio of activator to catalyst | Hardening Time (sec) | Foam Density (g/cm³) |
|---|---|---|---|---|
| 1 | 1/300 | 0.4 | Does not harden | — |
| 2 | 1/80 | 1.5 | 68 | 0.069 |
| 3 | 1/60 | 2.0 | 66 | 0.068 |
| 4 | 1/30 | 4.0 | Does not harden | — |

EXAMPLE 10

ε-Caprolactam in the amount of 135.6 g is melted to a flask under an atmosphere of dry nitrogen gas and 7.82 g of metallic potassium is gradually added thereto with stirring to form a caprolactam containing 1/5 mole of potassium caprolactam per mole of lactam. Then 6.34 g of this mixture and 95 g of ε-caprolactam are weighed to form a caprolactam containing 1/100 mole of potassium caprolactam per mole of lactam, which is melted in an oil bath at 130° C. The resulting mixture is designated as "Component 1".

Ten grams of toluene, 1 g of silicone surfactant SH-193 (manufactured by Toray Silicone Co.), and 2.5 g of hexamethylene diisocyanate (1/60 mole per mole of caprolactam) are weighed into a beaker. The resulting mixture is designated "Component 2".

Components 1 and 2 are mixed and stirred for about 10 seconds, and the resulting mixture is transferred to a foaming vessel. Foaming begins immediately and hardening of the foam is completed after 45 seconds.

The resulting foam is rigid having uniform fine cells and a density of 0.037 g/cm³.

EXAMPLE 11

A lactam is prepared by the same procedure as Example 3 using a mixture of 3.1 g of m-xylylene diisocyanate (1/54 mole per mole of caprolactam) and 2.5 g of hexamethylene diisocyanate (1/60 mole per mole of caprolactam) instead of 6.2 g of m-xylylene diisocyanate in Component 2. Foaming is completed after 45 seconds. The resulting foam is rigid having uniform and fine cells and density of 0.040 g/cm³.

EXAMPLE 12

Six point two grams of caprolactam containing 1/5 mole of sodium caprolactam, 86.7 g of ε-caprolactam and 8.3 g of dodecanolactam are weighed into a stainless beaker to form a mixture of caprolactam and dodecanolactam, and the mixture is melted in an oil bath at 130° C. The resulting mixture is designated "Component 1".

Ten grams of toluene, 1 g of silicone surfactant SH-193, and 2.5 g of hexamethylene diisocyanate (1/60 mole per mole of caprolactam) are weighed into a beaker. The resulting mixture is designated "Component 2".

Components 1 and 2 are mixed and stirred for about 10 seconds, and the resulting mixture is transferred to a foaming vessel. Foaming is completed after about 46 seconds, and the resulting foam is rigid having uniform fine cells and density of 0.041 g/cm³.

What is claimed is:

1. A process for producing a polyamide foam which comprises polymerizing a mixture of (1) ε-caprolactam, dodecanolactam, or a mixture thereof at a temperature of from 120° to 160° C, (2) sodium lactam as catalyst and (3) an activator selected from the group consisting of hexamethylene diisocyanate, m-xylylene diisocyanate and hydrogenated diphenylemethane-4,4'-diisocyanate, the molar ratio of catalyst/lactam being in the range of from 1/10 to 1/200 and the molar ratio of activator/catalyst being in the range of from 0.5/1 to 2.5/1.

2. A process according to claim 1 wherein the activator/catalyst ratio is about 1.5:1.

3. A process according to claim 1 wherein a volatile foaming agent is used.

4. A process according to claim 1 wherein a decomposition-type foaming agent is used.

* * * * *

UNITED STATES PATENT AND TRADEMARK OFFICE
CERTIFICATE OF CORRECTION

PATENT NO. : 4,022,719
DATED : May 10, 1977
INVENTOR(S) : TORU OKUYAMA ET AL

It is certified that error appears in the above-identified patent and that said Letters Patent are hereby corrected as shown below:

On front page of the patent following data element [63] insert
--[30]   Foreign Application Priority Data
          Nov. 13, 1971         Japan          92042/1971--

Column 3, line 50, change "specifically" to --specially--.

Column 3, line 54, after "mole" insert --of--.

Column 8, line 40, change "to" to --in--.

Signed and Sealed this

Sixth Day of December 1977

[SEAL]

Attest:

RUTH C. MASON
Attesting Officer

LUTRELLE F. PARKER
Acting Commissioner of Patents and Trademarks